US005634537A

United States Patent [19]

Thorn

[11] Patent Number: 5,634,537

[45] Date of Patent: Jun. 3, 1997

[54] LOCKING AND POSITIONING DEVICE

[75] Inventor: Richard P. Thorn, Erie, Pa.

[73] Assignee: Lord Corporation, Erie, Pa.

[21] Appl. No.: 423,237

[22] Filed: Apr. 19, 1995

[51] Int. Cl.$^{6}$ .................................................... F16F 9/32

[52] U.S. Cl. ............... 188/300; 297/344.13; 297/344.22; 248/418

[58] Field of Search ....................... 188/300; 297/344.13, 297/344.1, 344.22, 344.18; 248/418, 132

[56] References Cited

U.S. PATENT DOCUMENTS

| | | | |
|---|---|---|---|
| 1,772,240 | 8/1930 | Burk . | |
| 2,042,443 | 5/1936 | Buckstone | 248/161 |
| 2,651,386 | 9/1953 | Rossell | 188/300 X |
| 2,985,226 | 5/1961 | Maurer et al. | 155/25 |
| 3,338,626 | 8/1967 | Hamilton | 297/115 |
| 3,489,458 | 1/1970 | Karlsen | 297/417 |
| 3,861,815 | 1/1975 | Landaeus | 403/370 |
| 3,885,764 | 5/1975 | Pabreza | 248/162 |
| 3,950,027 | 4/1976 | Wilson | 297/416 |
| 3,993,350 | 11/1976 | McFarlane | 297/417 |
| 4,072,288 | 2/1978 | Wirges et al. | 248/404 |
| 4,176,878 | 12/1979 | Koutsky | 297/115 |
| 4,411,471 | 10/1983 | Ponzellini | 297/417 |
| 4,562,987 | 1/1986 | Leeds et al. | 248/278 |
| 4,588,226 | 5/1986 | Young et al. | 297/344.1 X |
| 4,655,632 | 4/1987 | Smith | 248/418 X |
| 4,779,925 | 10/1988 | Heinzel | 297/301 |
| 4,872,727 | 10/1989 | Rye | 297/411 |
| 4,882,103 | 11/1989 | Stenvall | 297/411 |
| 4,884,845 | 12/1989 | Schmale et al. | 297/367 |
| 4,884,846 | 12/1989 | Tobler | 297/411 |
| 4,917,438 | 4/1990 | Morgan | 297/411 |
| 4,951,995 | 8/1990 | Teppo et al. | 297/411 |
| 4,968,094 | 11/1990 | Froyland et al. | 297/411 |
| 5,056,863 | 10/1991 | DeKraker et al. | 297/411 |
| 5,331,718 | 7/1994 | Gilbert et al. | 188/300 X |

*Primary Examiner*—Peter M. Poon
*Attorney, Agent, or Firm*—Richard K. Thomson; Randall S. Wayland; James W. Wright

[57] ABSTRACT

A locking and positioning device (20) for allowing unlocking and adjustment and then relocking of multiple degrees of freedom with a singular actuation mechanism (26). The device (20) includes a first locking mechanism (22) and a second separate, independent, and spaced apart locking mechanism (24) both of which are actuated by a singular actuation device (26). The first locking mechanism and second locking mechanism may be locked simultaneously or independently with the same actuation device (26).

19 Claims, 9 Drawing Sheets

LOCKING AND POSITIONING DEVICE

FIELD OF THE INVENTION

This invention relates to the area of devices for locking, unlocking and positioning of a first member relative to a second member. Specifically, the invention relates to a locking and positioning device which may lock up multiple degrees of freedom.

RELATED APPLICATIONS

The present application is related to application Ser. No. 08/424,925 entitled "Adjustable, Lockable Device", filed Apr. 19, 1995 now abandoned.

BACKGROUND OF THE INVENTION

Locking and positioning devices are used to lock and unlock movement of a first member relative to a second member to allow positioning or repositioning therebetween. For example, locking devices are known which lock along a single axis. U.S. Pat. No. 3,885,764 to Pabreza describes one such locking and positioning device which locks vertical motion along a vertical axis. The Pabreza device has applicability to height adjustments of chairs. The locking action in the Pabreza device also locks angular rotation about that same vertical axis. The adjustment is accomplished by actuation of a cam and lever device. U.S. Pat. No. 2,042,443 to Buckstone describes another mechanism for locking vertical motion which requires a separate and independent device for locking rotary motions of brackets F and G. Tripods are an additional example of devices which generally have a locking mechanism for each degree of freedom. U.S. Pat. No. 5,056,863 to DeKraker et al. illustrates a method of lateral adjustment of an armrest. U.S. Pat. No. 3,861,815 to Landaeus describes a device for releasably mounting a hub or a wheel onto a shaft. None of these aforementioned devices can lock and allow adjustment of greater than two degrees of freedom with the action of a singular actuation device.

SUMMARY OF THE INVENTION

The present invention is a locking and positioning device which, by operation of one singular actuation device, allows positioning or repositioning of multiple degrees of freedom of a first member relative to a second member, and then, allows locking into a newly adjusted position by operation of the same singular actuation device. Therefore, the present invention allows for ease of adjustment of multiple degrees of freedom, yet without the multiple actuation devices required by prior devices. In particular, the present invention can allow adjustment and positioning of greater than two and up to as many as five degrees of freedom with actuation of a singular actuation device.

It is an advantage of the present invention that the need for multiple lever or actuation devices to accomplish locking and positioning in devices requiring adjustment of multiple degrees of freedom is eliminated. The invention has particular application to adjustment of chair seats and armrests, tripods, wheel chairs, stands, furniture, bike seats and the like.

The abovementioned and further novel features and advantages of the present invention will become apparent from the accompanying descriptions of the preferred embodiments and attached drawings.

BRIEF DESCRIPTION OF THE DRAWINGS

The accompanying drawings which form a part of the specification, illustrate several embodiments of the present invention. The drawings and description together, serve to fully explain the invention. In the drawings.

DETAILED DESCRIPTION OF THE INVENTION

Figure 1A:
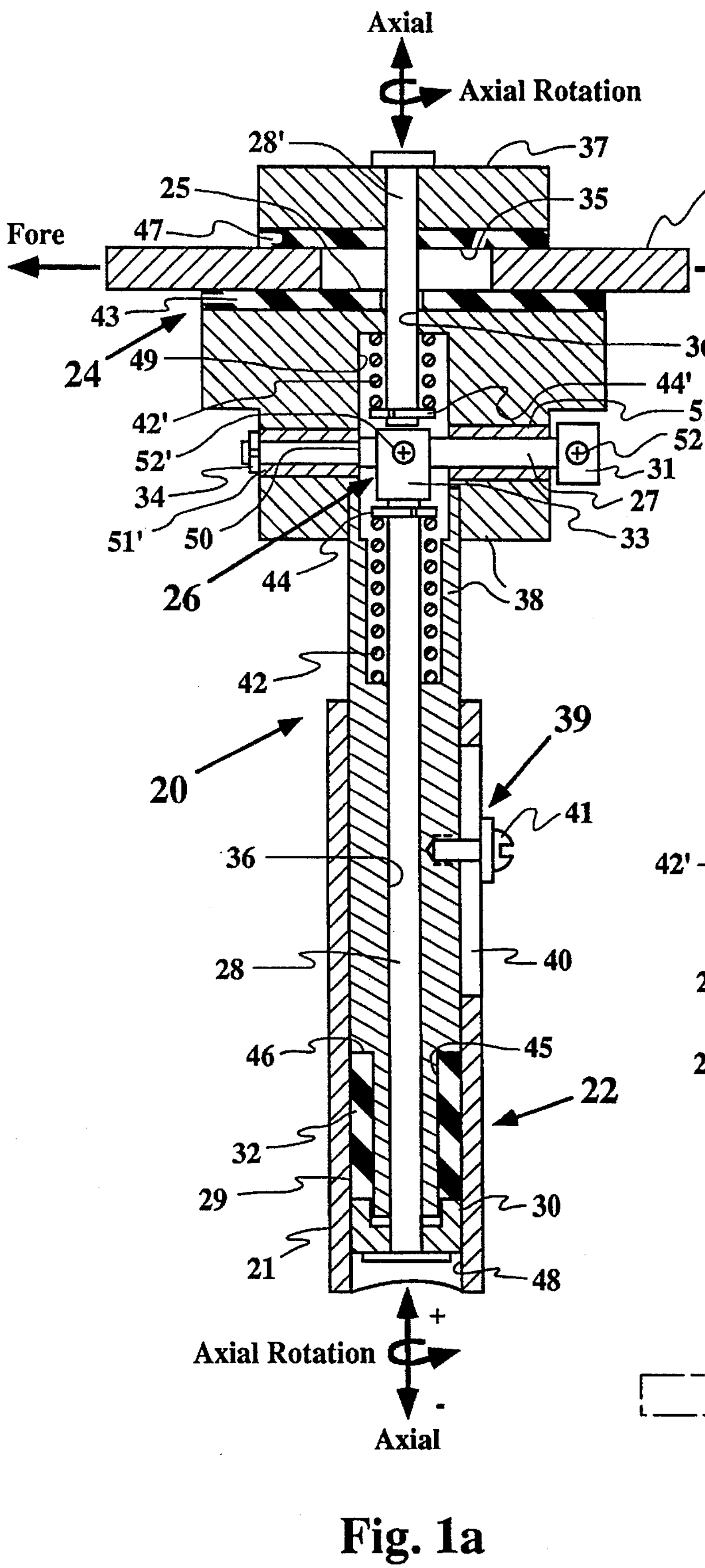
FIG. 1*a* is a partially sectioned side view of one embodiment of the locking and positioning device.

As best shown in FIG. 1*a*, the first embodiment of locking and positioning device 20 includes a first locking mechanism 22, a second locking mechanism 24, and an actuation device 26. The singular actuation device 26 allows the user to control multiple degrees of freedom with the actuation of a single actuation device. In addition, the locking and positioning device is useful for allowing locking and adjustment of greater than two, and as many as five, degrees of freedom. In the case of the FIG. 1*a* embodiment, axial translation, fore and aft translation, lateral translation (into and out of the paper), and axial rotation about the vertical axis, may be adjusted and locked with the action of a singular actuation device 26. Thus, the novel invention, with a singular actuation by the user, provides ease of adjustment and locking. The actuation device 26 may be used to lock and/or allow positioning of first locking mechanism 22 independently from the second locking mechanism 24. Alternatively, with proper design of the cam, both the first locking mechanism 22 and the second locking mechanism 24 may be adjusted simultaneously.

Referring still to FIG. 1*a*, the first locking mechanism 22 is used to lock and allow positioning of at least one degree of freedom of the second member 23 relative to the first member 21. Positioning and locking may be allowed along an axial axis as well as rotation about that same axial axis, i.e., axial rotation. The first locking mechanism 22 has a locked and unlocked position and includes an actuation rod 28, a compressing element 30, a bulging member 32, a spring 42, and a retainer 44. The actuation rod 28 is preferably received within a guide 36 formed in the housing 38. In the first locking mechanism 22, the actuation rod 28 is preferably attached to, and interacts with, the compressing element 30 to cause an axial force to be applied or relieved on the end portion of the bulging member 32. The bulging member 32 preferably slides over a pilot 45 formed on the housing 38. The bulging member 32 is preferably made of highly damped material with a high coefficient of friction such as natural rubber, blends of natural and synthetic rubbers, nitrile, silicone or other like materials, and is normally placed in compression by the action of spring 42. The bulging member 32 ideally should exhibit a large amount of friction relative to the bore 48 formed in first member 21. This is achieved by having a smooth surface on the bore 48 and on the outer periphery 29 of the bulging member 32. It is also important to minimize the pressurizing area (that end of the bulging member 32 which is in contact with the compressing element 30) and maximize the contact area (defined by the outer periphery 29 of the bulging member 32). The spring 42, which is preferably a coil spring, provides a spring force (to be described later) in the positive (+) axial direction against retainer 44. The retainer 44 may be a c-clip or the like. In this embodiment, an axial control force of about 10 pounds may cause a clamping force of as high as 1000 pounds.

Figures 2A, 2B, 2C, 2D:
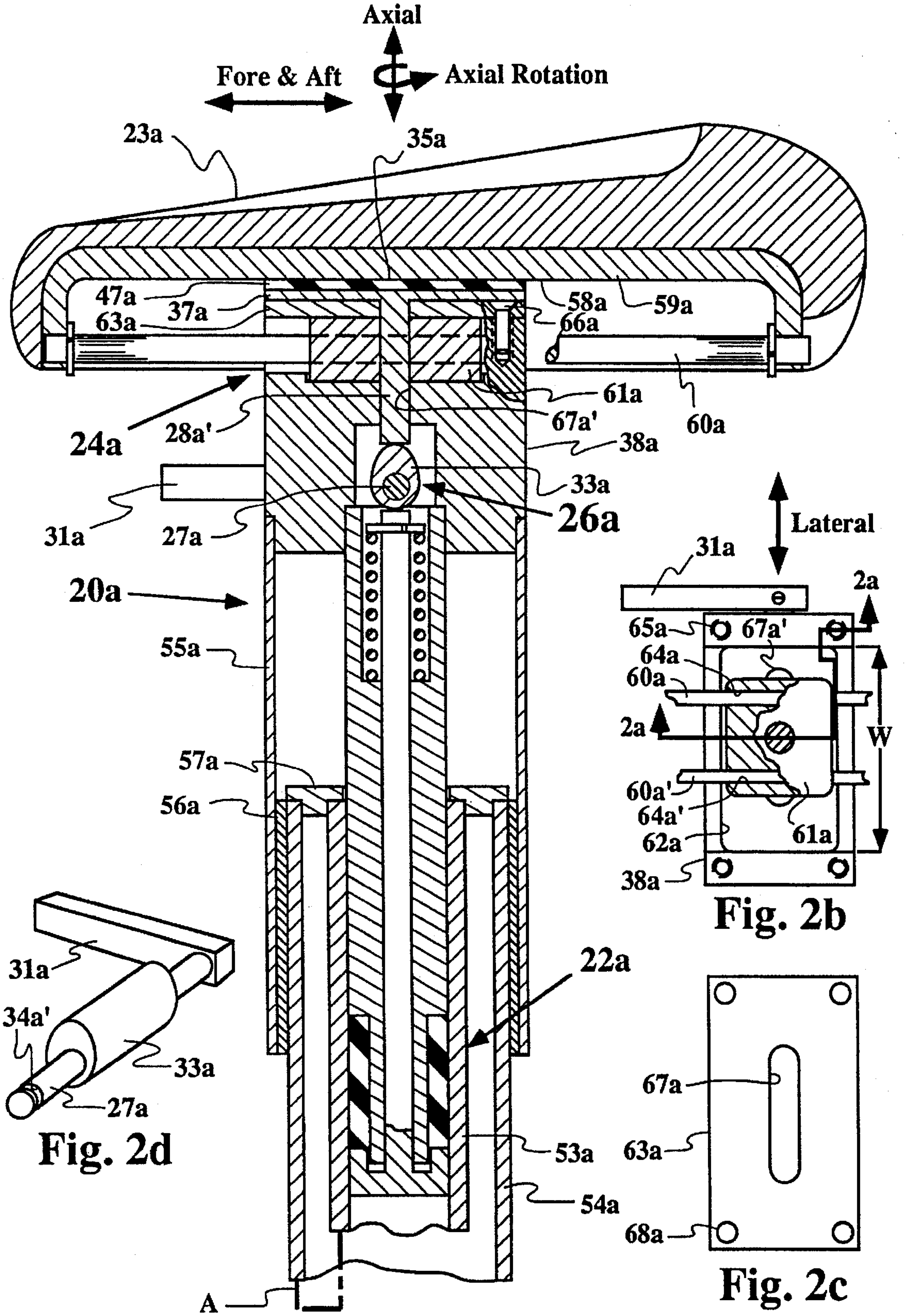
FIG. 2*a* is a partially sectioned side view of another embodiment of locking and positioning device capable of locking axial, axial rotation, lateral and fore and aft movements illustrated in the environment of a bicycle seat.
FIG. 2*b* and 2*c* are partial and reduced views of components of lateral and fore and aft locking portions of the second locking mechanism.
FIG. 2*d* is an isometric view of the cam, shaft and lever portions of the actuation device.

The abovementioned spring force causes a spring bias acting upon the actuation rod 28 and, in turn, causes a spring bias on the compressing element 30 to move the compressing element 30 axially along the described axis to axially compress bulging member 32. Because bulging member 32 is compliant and preferably has a high bulk modulus, axial compression against the abutment 46 causes significant radial expansion of the bulging member 32. This is due to the high bulk modulus which makes the material essentially incompressible. This radial expansion causes the bulging member 32 to expand and lockingly interact with the bore 48 formed in the first member 21 locking the position of the first member 21 relative to the second member 23 in the axial and axial rotation directions. The bore 48 may be round, oblong, square, rectangular or other similar shapes. Ultimately any shape may be used as long as the bulging member 32 can be made to expand into the bore 48 to cause a locking interaction. It should be noted that the compressing element 30 and actuation rod 28 could be manufactured as one element as shown in FIG. 2*a*.

In FIG. 1*a*, the first locking mechanism 22 preferably includes a limiting stop 39 which restrains the amount of axial travel within predefined limits. In this embodiment, the limiting stop 39 is comprised of a rider 41 slidably located in and slidably operable with a slot 40 formed in the first member 21. The rider 41 may be a pin, screw or other like protrusion. Alternatively to the arrangement shown, the slot 40 may be formed in the housing 38 and the rider 41 may be protruding from the first member 21. In this embodiment, the slot 40 is of the appropriate length to allow approximately 4–8 inches of travel along the axial axis. The slot 40 and rider 41 also have the effect of restraining rotational movement of the first member 21 relative to the housing 38. However, some amount of rotational adjustment may still be accomplished at the second locking mechanism 24, if desired.

The second locking mechanism 24 is separate, independent and spaced apart from the first locking mechanism 22 in that it has a separate actuation rod 28' and will allow locking and adjustment of different degrees of freedom than are locked by the first locking mechanism 22. In this embodiment, the second locking mechanism 24 also locks and allows adjustment of at least one other degree of freedom not locked by the first locking mechanism 22. In particular, fore and aft, lateral, and rotational motion about the axial axis may be adjusted and locked by the second locking mechanism 24.

Again referring still to FIG. 1*a*, the second locking mechanism 24 includes a first clamping surface 25 adjacent the housing 38, a second clamping surface 35 adjacent a clamping member 37, an actuation rod 28', a spring 42' and a retainer 44'. The first clamping surface 25 is preferably formed on first compliant pad 43 which may be preferably manufactured from natural rubber or other like high-friction coefficient, preferably welldamped material and which is hot or cold bonded to the housing 38, but not bonded to second member 23. Preferably, the clamping member 37 also includes a second compliant pad 47, of like material to the first complaint pad 43, formed thereon and bonded thereto. The second compliant pad 47 has a second clamping surface 35 formed thereon. The second clamping surface 35 is not bonded to the second member 23. Preferably the first and second clamping surfaces 25 and 35 are substantially planar, parallel and opposing each other. Together, surfaces 25 and 35 from the means for gripping the second member 23.

The clamping member 37 is attached and connected to the actuation rod 28' which preferably interacts with guide 36'. Guide 36' acts to center the clamping member 37 relative to the housing 38, but this is not essential. The spring 42' is retained in housing pocket 49 by retainer 44' in such a manner as to cause a spring force to bias the clamping member 37, and thus, the second clamping surface 35 into contact with the second member 23. This causes second member 23 to contact first clamping surface 25 of second compliant pad 47 and lock the position of the second member 23 in place relative to the first member 21. Locking and positioning of for and aft, lateral, as well as axial rotation may be accomplished at the second locking mechanism 24.

An actuation device 26, which is operable by a user, is operable to actuate the first locking mechanism 22 and/or the second locking mechanism 24 either simultaneously or individually depending on the arrangement and design of the cam 33. With the appropriate action of the actuation device 26, this embodiment allows the adjustment and positioning of the first locking mechanism 22 while leaving the second locking mechanism 24 in a locked position. This may allow adjustment along the axial translational axis or about the axial axis (only if limit stops 39 are not used).

Further, by rotating the lever 31 of the actuation device 26 to another position, the second locking mechanism 24 may be unlocked and allow adjustment and positioning of the second member 23 relative to the first member 21 in another degree of freedom, while leaving the first locking mechanism 22 in the locked position.

Finally, both the first and second locking mechanisms 22 and 24 may be locked at once, facilitating a complete locking of the locking and positioning device 20. FIG. 1*a* illustrates shows the first locking mechanism 22 in the unlocked position and the second locking mechanism 24 locked. The actuation device 26 in this embodiment is comprised of a shaft 27 which is preferably pivotally received in housing 38 and is pivotally held in place along its axis relative to the housing 38 by bushings 51 and 51' and by shoulder 50 and clip 34. Lever 31 is rigidly attached to shaft 27 by fastener 52. Likewise, cam 33 is also rigidly attached to shaft 27 by fastener 52'.

Figure 1B:
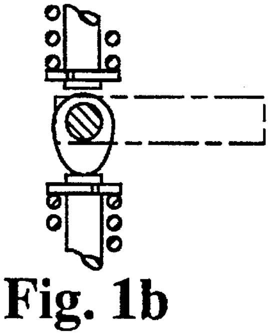
FIG. 1*b*, 1*c*, and 1*d* are partial views illustrating various actuation positions of the actuation device for selectively locking and unlocking the first and second locking mechanisms.
Figure 1C:
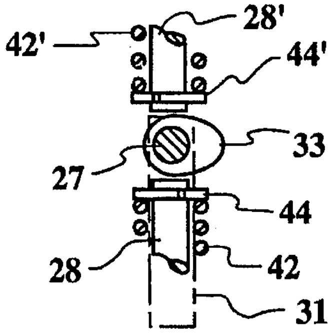
Figure 1D:
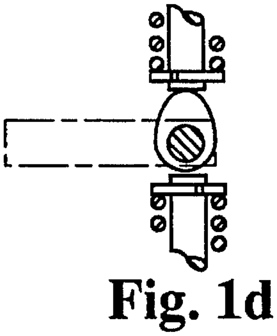

FIGS. 1*a*, 1*b*, and 1*c* illustrate the various combinations of locking and unlocking possible. FIG. 1*b* illustrates the first locking mechanism 22 being in the unlocked position (axial force on bulging member 32 relieved) and the second locking mechanism 24 being in the locked position (clamping force applied to second member 23). FIG. 1*c* illustrates the first locking mechanism 22 and the second locking mechanism 24 being in the locked position. Finally, FIG. 1*d* illustrates the first locking mechanism 22 being in the locked position and the second locking mechanism 24 being in the unlocked position.

FIG. 2*a* illustrates another embodiment of locking and positioning device 20*a* in yet another possible application. In the following series of figures, like numerals denote like components as compared to the FIG. 1 embodiment. The locking and positioning device 20*a*, of this embodiment, also includes a first locking mechanism 22*a*, a second locking mechanism 24*a*, and an actuation device 26*a*. The first locking mechanism 22*a* is similar to that of the FIG. 1 embodiment. The primary difference in this embodiment is that an inner tube 53*a* is included, an outer tube 54*a* and a sleeve 55*a*. Inner tube 53*a* and outer tube 54*a* are connected together near the base (not shown) of the tubes 53*a* and 54*a* so as to form an integral rigid unit as indicated by the heavy line A. It is preferable to have a spacer 57*a* to maintain the coaxial relationship of inner tube 53*a* and outer tube 54*a* such that the first locking mechanism 22*a* can slide freely over its adjustment range. Sleeve 55*a* which is part of housing 38*a*, and is integrally attached thereto by press fitting, has a sleeve bushing 56*a* manufactured of low friction material rigidly attached or adhered thereto. Alternately, sleeve bushing 56*a* could be attached to outer tube 54*a*. Therefore, during adjustment, sleeve 55*a* telescopically slides relative to outer tube 54*a* along the axial axis.

Referring now to FIG. 2*a*, FIG. 2*b*, and FIG. 2*c*, axial translation and axial rotational motions are locked by first locking mechanism 22*a* in a similar manner as the FIG. 1*a* embodiment. A key differences are the lack of a limiting stop in the first locking mechanism 22*a* and that the second locking mechanism 24*a* is not spring biased. The second locking mechanism 24*a* is actuated by moving the cam 33*a* into contact with end of actuation rod 28*a*'. Actuation rod 28*a*' is attached to, and in this case, rigidly connected to clamping member 37*a*. Clamping member 37*a*, which preferably includes compliant pad 47*a*, comes into contact with surface 58*a* on frame 59*a* as a result of cam 33*a* engagement. Second member 23*a*, in this embodiment is a bike seat or the like or, alternatively, it could be an adjustable armrest on a chair, or the like. Forcing the surfaces 35*a* and 58*a* together, via actuation of actuation device 26*a*, causes a reaction force to be exerted through frame 59*a* and into guide rods 60*a* and 60*a*' and the into housing 38*a* indirectly through block 61*a*. This locks the lateral and fore and aft movement.

Lock 61*a* is normally free to slide in a block channel 62*a* formed in housing 38*a* to allow lateral adjustment. The amount of lateral adjustment depends on the width W of block channel 62*a* as well as the width of block 61*a*. Plus or minus about an inch of lateral adjustment is achievable. Fore and aft adjustment of approximately plus or minus two inches is achieved by guide rods 60*a* and 60*a*'sliding within through bores 64*a* and 64*a*'.

When the second locking mechanism 24*a* is actuated, this causes actuation rod 28*a*' to push against clamping member 37*a*, which in turn, pushes second compliant pad 47*a* against surface 58*a* of frame 59*a* and produces a friction between surface 59*a* and second compliant pad 47*a*. As a result of this actuation, the reaction load causes friction between the rods 60*a* and 60*a*' and through bores 64*a* and 64*a*'. Likewise, friction is created between the block 61*a* and the under side of plate 63*a*. Together, the frictional interaction of these elements causes locking of lateral and fore and aft movement of the second locking mechanism 24*a*. Plate 63*a* is preferably fastened to housing 38*a* by way of fasteners 66*a* inserted through holes 68*a* and threaded into threaded holes 65*a* formed in housing 38*a*. Rod slot 67*a* in plate 63*a* and like rod slot 67*a*' in housing 38*a* allows for lateral adjustment. Lateral stops may be achieved by appropriate sizing of rod slots 67*a* and 67*a*' or block channel 62*a*. Fore and aft stop may be achieved by appropriate sizing of frame 59*a*.

FIG. 2*d* illustrates the elongated shape of the cam 33*a* required for lateral adjustment in this embodiment. During assembly, cam 33*a* slides over shaft 27*a* and is secured in place by set screw (not shown). Lever 31*a* attaches to shaft 27*a* in a like fashion. Also illustrated is clip groove 34*a*' for receiving c-clip (not shown). The reason the lobe on the cam 33*a* is laterally elongated is such that no matter what the position of lateral adjustment of the seat, the actuation rod 28*a*' will be able to contact the cam 33*a* for actuation.

Figures 3A, 3B:
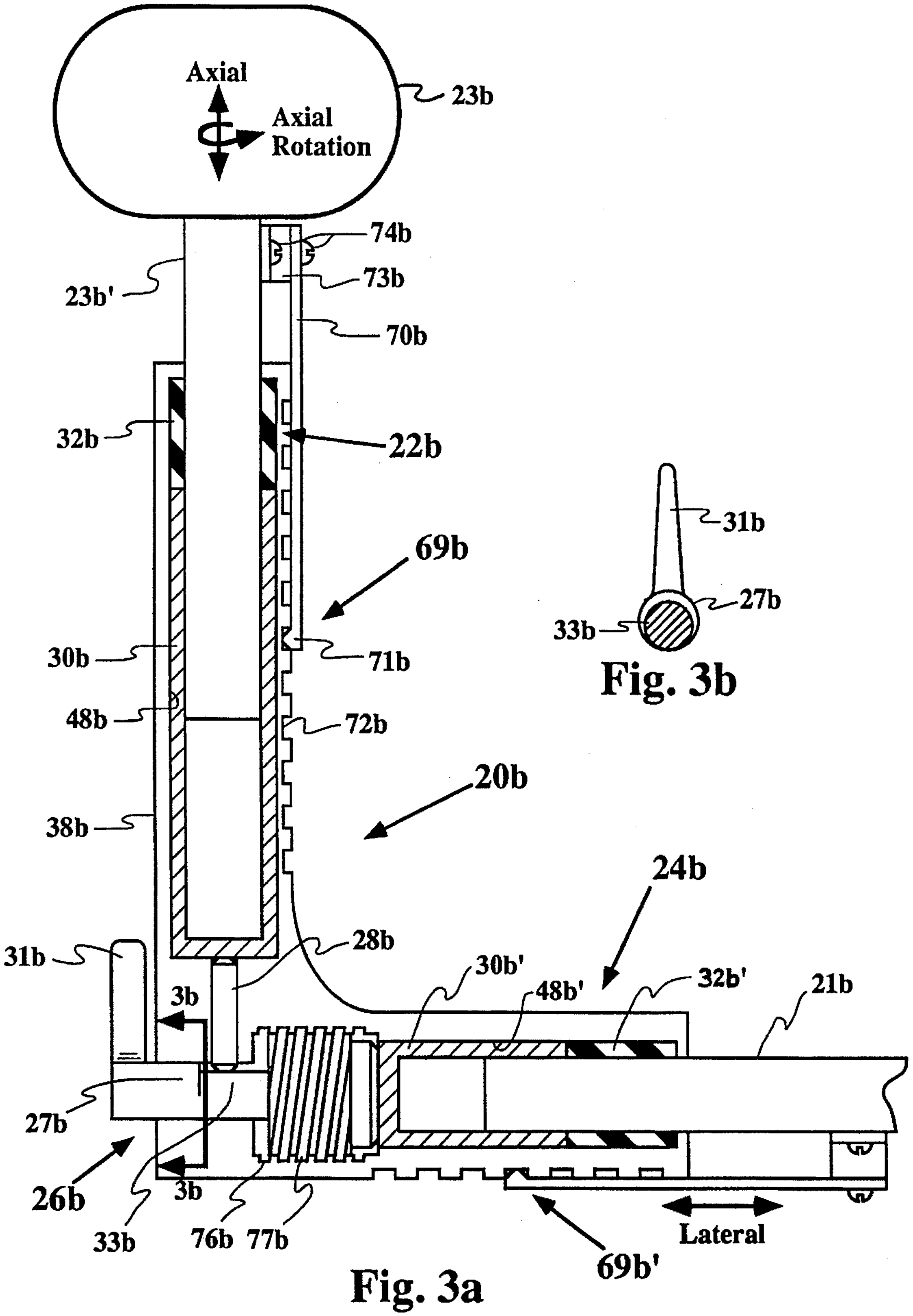
FIG. 3*a* is a partially sectioned side view of another embodiment of the locking and positioning device capable of locking axial, axial rotation, and lateral movements and illustrating one type of detent mechanism and a threaded actuation device.
FIG. 3*b* is an end view of the lever illustrating the offset of cam from shaft.

FIG. 3*a* illustrates another embodiment of locking and positioning device 20*b*. This embodiment also includes a first locking mechanism 22*b*, second locking mechanism 24*b*, and actuation device 26*b* and is shown in the environment of an adjustable armrest of an office chair or wheel chair. The first member 21*b* is an extension tube or the like and is attached to the frame or seat of the chair. The second member 23*b* is an armrest or the like. This locking and positioning device 20*b* allows adjustment and locking of the second member 23*b* relative to the first member 21*b* in the lateral, axial and axial rotation directions.

The first locking mechanism 22*b* is comprised of a compressing element 30*b* which compresses bulging element 32*b* to cause radial expansion outwardly into bore 48*b* formed in housing 38*b* and inwardly toward pilot 23*b*' which locks axial translation and axial rotation. The locking and adjustment is accomplished by a user rotating lever 31*b* into the appropriate position. Lever 31*b* is connected to cam 33*b* via shaft 27*b*. Rotation of lever 31*b* causes cam 33*b* to translate actuation rod 28*b* which, in turn, actuates compressing element 30*b* to cause radial expansion of the bulging member 32*b* and locking of the first locking mechanism 22*b* relative to housing 38*b* and first member 21*b*.

In the position shown, both the first and second locking mechanisms 22*b* and 24*b* are unlocked. Rotating lever 31*b* in one direction will lock only along the axial axis, while rotating the lever 31*b* in the other direction will cause locking of both first and second locking mechanisms 22*b* and 24*b*, thus locking lateral, axial and rotational motions. The housing 38*b* in this embodiment is preferably made in halves which, after assembly of the components therein, are glued or otherwise fastened together. For example, they could be fastened together by way of screws, bolts, adhesive or a mechanical snap-fit. Preferably, the housing 38*b* is manufactured in an injection molding process from a plastic material.

In FIG. 3*a*, the second locking mechanism 24*b* is comprised of components similar to the first locking and positioning device 22*b* such as a compressing element 30*b'* and bulging element 32*b'*. The actuation device 26*b* that actuates both first locking mechanism 22*b* and the second locking mechanism 24*b*, in this embodiment, includes a threaded member 77*b* which cooperates with threads 76*b* formed in housing 38*b* such that when lever 31*b* is rotated, threaded member 77*b*, which is preferably rigidly connected to shaft 27*b*, is advanced or is retreated within threads 76*b*. Advancing causes compressing member 30*b'* to advance in bore 48*b'* and compress bulging member 32*b'* and cause lateral locking. Contrawise, retreating threaded member 77*b* causes relaxation of compression on bulging member 32*b'* and allows lateral adjustment.

Rotation of the first member 23*b* (into and out of the paper) about the axis of the first member 21*b* may also be allowed in this embodiment if first member 21*b* is cylindrical. If desired, first member 21*b* may be square or elliptically shaped, or have a key and key way mechanism, so rotation may be restrained. Detent 69*b* allows vertical adjustment in incremental steps. Detent 69*b* is comprised of attachment bracket 73*b* and an arm 70*b*, which is flexible, attached to first member 23*b* by screws 74*b*. Locator 71*b* formed on end of arm 70*b* operates with grooves 72*b* formed on housing 38*b*. Likewise, detent 69*b'* is present for providing incremental lateral adjustments of the second member 23*b* relative to the first member 21*b*. Grooves 72*b* may extend radially part way around housing 38*b* to allow detent 69*b* to operate regardless of the rotational position of second member 23*b*.

FIG. 3*b* illustrates a cross-sectional view of the lever 31*b* as seen along line 3*b*—3*b* in FIG. 3*a*. This view illustrates that the eccentric action for actuation of actuation rod 28*b* is formed by offsetting the cam 33*b* from the center of the shaft 27*b*.

Figures 4A, 4B:
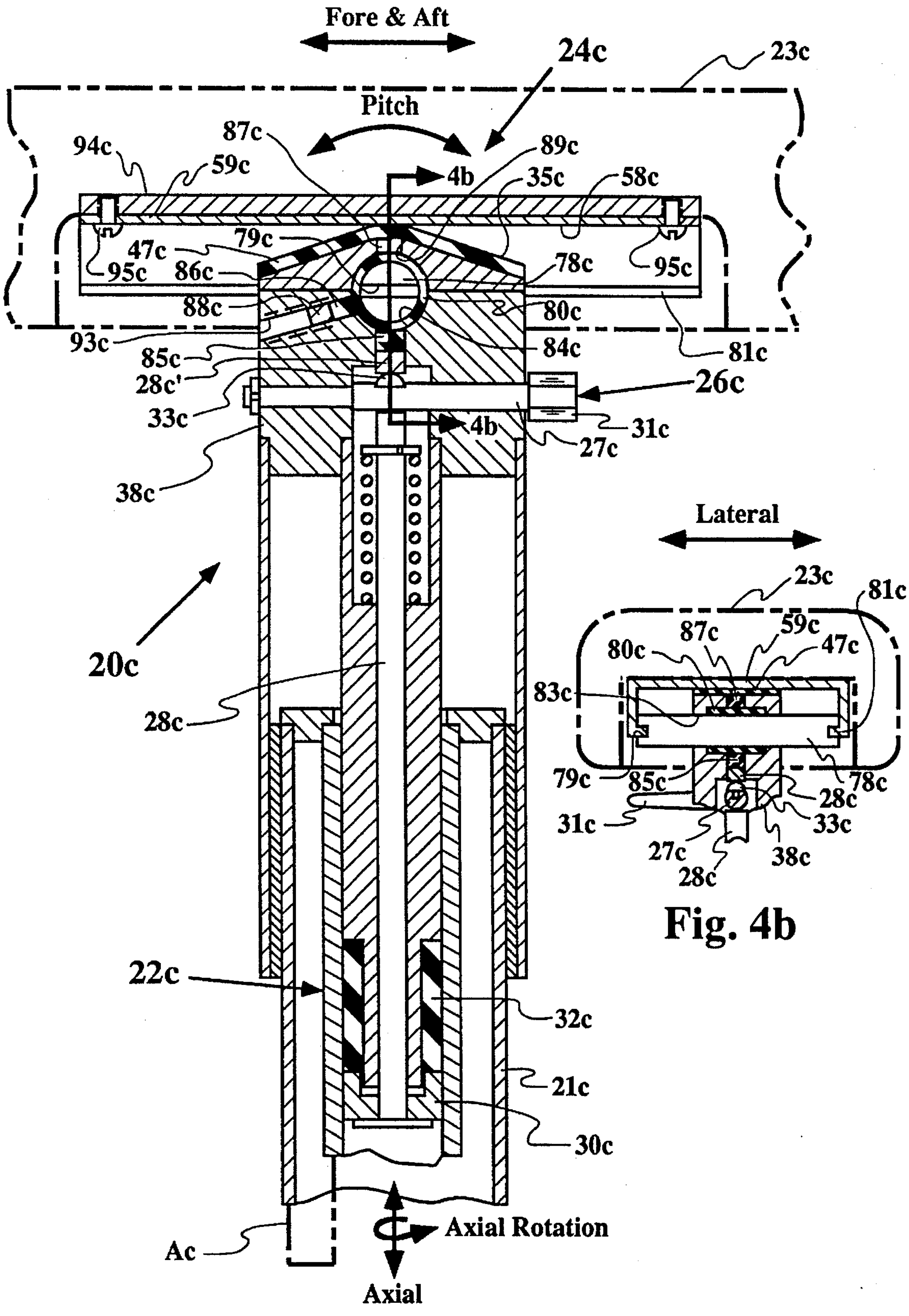
FIG. 4*a* is a partially sectioned side view of the another embodiment of the locking and positioning device capable of locking five degrees of freedom including axial, axial rotation, lateral, fore and aft, and pitch movements.
FIG. 4*b* is a partial and reduced frontal section view of the second locking mechanism illustrating lateral adjustment capability.

FIG. 4*a* and FIG. 4*b* illustrate another embodiment of locking and positioning device 20*c*. Like the FIG. 2*a* embodiment, this device also includes a first locking mechanism 22*c*, a second locking mechanism 24*c*, and an actuation device 26*c*. The main difference in this embodiment is that the second locking mechanism 24*c* allows a pitch adjustment, whereas the FIG. 2*a* embodiment does not. The pitch adjustment allows adjustment of the pitch alignment of the second member 23*c* relative to the first member 21*c* to suit the user, such as with an armrest of a chair or the like. In all, this embodiment allows adjustment and locking of five degrees of freedom with the action of a singular actuation device 26*c*, specifically three degrees of freedom of the second locking mechanism 24*c* and two degrees of freedom of the first locking mechanism 22*c*. It should be noted, the first locking member 22*c* is identical to that in the FIG. 2*a* embodiment except that the compressing element 30*c'* is separate from the actuation rod 28*c'*.

The second locking mechanism 24*c* comprises a slide pin 78*c* which is preferably solid and cylindrical and is surrounded about its periphery by a compliant sleeve 80*c*. Compliant sleeve 80*c* is not bonded to slide pin 78*c*, and is retained within pocket 84*c* formed in housing 38*c*. For proper operation, compliant sleeve 80*c* should be lubricated with a dry film lubricant or grease. Slide pin 78*c* is inserted through slide pin bore 83*c* formed in housing 38*c* and through the compliant sleeve 80*c*. Channel slots 79*c* formed in both ends of slide pin 78*c* ride along channels 81*c* formed on frame 59*c* to allow fore and aft adjustment. Frame 59*c* is attached to second member 23*c*, such as an armrest or the like, by way of bonding plate 94*c*.

Locking in the second locking mechanism 24*c* occurs when a user actuates actuation device 26*c* by rotating lever 31*c*, causing shaft 27*c* and cam 33*c*, in this case a rivet head, to rotate, and to contact and move actuation rod 28*c* axially. Actuation rod 28*c* contacts first compliant puck 85*c* causing it to contact compliant sleeve 80*c* locally on the underside thereof. A second compliant puck 86*c* is also in contact with compliant sleeve 80*c*. Set screw 88*c* is advanced in threaded bore 93*c* to bring set screw 88*c* into contact with second compliant puck 86*c*. Exerting pressure on second puck 86*c*, in essence, is an adjustment to take the play out of the system, so to speak, and allow proper locking. It is best to envision lubricated compliant sleeve 80*c* as being somewhat fluid, i.e., it may fluidly move about the periphery of slide pin 78*c* and within the pocket 84*c* formed in the housing 38*c*.

Since slide pin 78*c* is pivotally retained in slide pin bore 83*c* formed housing 38*c*, it cannot translate axially. Therefore, the local compression of compliant sleeve 80*c* caused by contact pressure of first compliant puck 85*c* causes a resulting pressure on third compliant puck 87*c*. This causes third compliant puck 87*c* to move axially within escape bore 89*c* and come into contact with compliant pad 47*c*. In operation, the high bulk modulus (incompressibility) of the compliant material used for manufacture of the compliant sleeve 80*c*, and compliant pucks 85*c*, 86*c* and 87*c* and the fact that there is no place within the pocket 84*c* into which the sleeve 80*c* can expand, causes the compliant sleeve 80*c* to bulge around the periphery of the slide pin 78*c*, in a fluid-like fashion, and into the escape bore 89*c*. Likewise, compliant puck 87*c* has nowhere to go, and because of its incompressibility, a pressure is created locally on compliant pad 47*c*. This local pressure causes locking of fore and aft, lateral and pitch motions. Fore and aft locking occurs because clamping surface 35*c* comes into contact with surface 58*c* on frame 59*c*. Lateral locking and pitch locking occurs because of the radial pressure of compliant sleeve 80*c* on periphery of slide pin 78*c* and on pocket 84*c* formed in housing 38*c* resulting from the actuation.

Figures 5A, 5B:
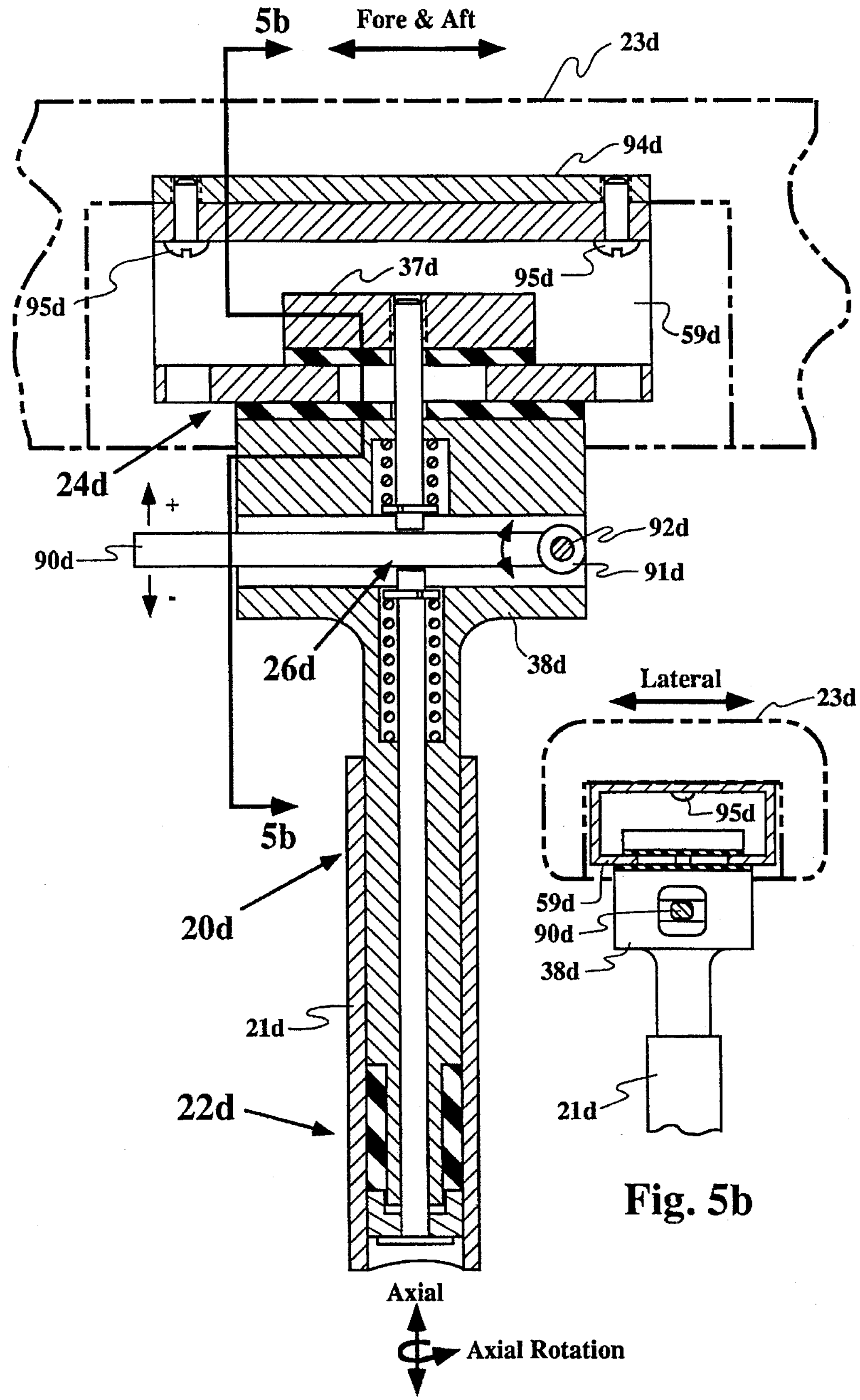
FIG. 5*a* is a partially sectioned side view of the another embodiment of the locking and positioning device capable of locking four degrees of freedom including axial, axial rotation, lateral, and fore and aft movements and including a trigger-type actuation device.
FIG. 5*b* is a partial and reduced frontal view of the second locking mechanism illustrating lateral adjustment capability with the frame shown in cross-section for clarity.

FIGS. 5*a* and 5*b* illustrate another embodiment of locking and positioning device 20*d* which incorporates an actuation device 26*d* of the trigger-type. The first and second locking mechanism 22*d* and 24*d* operate in the same fashion as the FIG. 1*a* embodiment. The main difference is in the actuation device 26*d*. In this embodiment, the actuation device 26*d* is comprised of a trigger 90*d* which is pivotally mounted to the housing 38*d* at pivot location 91*d* by pivot pin 92*d*. This embodiment does not require a cam mechanism. Actuation by the user of trigger 90*d* in the positive (+) direction allows the adjustment of the second locking mechanism 24*d*, i.e., lateral, fore and aft, and rotational motions. Actuation in the negative (–) direction allows adjustment of axial translation and axial rotation about the axial axis. The frame **59*d* in this embodiment is attached by way of hardware 95*d* to bonding plate 94*d* which is preferably integrally bonded to, and part of, the second member 23*d***.

FIG. **5*b* illustrates a partial and reduced frontal view of the locking and positioning device 20*d* illustrating the lateral adjustment capability and an end view of the trigger 90*d*. The frame is shown sectioned for clarity. In the trigger position shown, both the first and second locking mechanisms 22*d* and 24*d*** are locked.

FIG. **6*a* illustrates another embodiment of locking and positioning device 20*e*. The first locking mechanism 22*e* is identical to the FIG. 5*a* embodiment and the actuation device 26*e* and second locking mechanism 24*e* are similar in function to that shown in the FIG. 2*a* embodiment. The major difference is the use of another embodiment of detent 69*e* and 69*e*'** and the use of modular components allowing each degree of freedom, such as fore and aft, lateral and rotational to be individually attained by selecting the appropriate module.

The second locking mechanism **24*e*, in this modular embodiment, is comprised of a fore and aft module 96*e*, a lateral module 97*e*, and a rotation module 98*e*. When purchasing an adjustable unit, such as for a chair armrest, the user/purchaser may select the degrees of adjustment desired by selecting the appropriate module(s). For example, using the modular concept for the second locking mechanism 24*e*, the purchaser may select fore and aft adjustment only by purchasing the fore and aft module 96*e*. Alternatively, fore and aft and lateral adjustments may be selected by combining the fore and aft module 96*e* and the lateral module 97*e*. Additionally, rotational adjustment may be achieved, if desired, by adding the rotation module 98*e*. In essence, the purchaser may select the level of adjustment desired of the second locking mechanism 24*e*** via selection of the appropriate module(s).

The fore and aft module **96*e* operates to provide fore and aft adjustment and locking and comprises a slider 99*e* including channel slots 79*e* (FIG. 6*b*) for engaging and slidably operating with the channels 81*e* formed on the frame 59*e*. The fore and aft locking occurs by actuation of actuation rod 28*e*' causing it to contact surface 58*e* formed on frame 59*e*. The slider 99*e*, in this embodiment is a two piece puck-shaped member which is retained in a round hole formed in frame 59*e*'. Screw 93*e* attaches halves of slider 99*e* together. The fore and aft module 96*e* also includes detent 69*e* for allowing fore and aft adjustment in increments. The detent 69*e*, comprises a locator 71*e*, in this case a spherical ball, which locates relative to grooves 72*e*, in this case shallow recesses. A spring 100*e* biases the locator 71*e* into the grooves 72*e*. The groves 72*e*, alternatively, may be slots or like depressions. The fore and aft module 96*e* attaches to the second member 23*e* through bonding plate 94*e* via hardware 95*e* and to the lateral module 97*e* if one is used. Otherwise, the fore and aft module 96*e* may connect directly to the housing 38*e* or to a rotation module 98*e***.

The lateral module **97*e* also includes a frame 59*e*' having channel slots 79*e*' formed thereon for receiving and slidably engaging with channels 81*e*' formed on the slider 99*e*'. The lateral module 97*e* attaches to the fore and aft module 96*e* or directly to the second member 23*e* if a fore and aft module is not used. On the other end, the lateral module 97*e* may connect to the housing 38*e* or to the rotation module 98*e* if one is used. If the rotational module 98*e* is not used, then the slider 99*e*' may be manufactured as part of the housing 38*e***.

When the fore and aft and lateral modules **96*e* and 97*e* are used together, the cam 33*e* must be elongated in shape, such that no matter what the lateral position, the cam 33*e* is in contact with the actuation rod 28*e*'**.

The rotational module **98*e* allows limited rotational adjustment about the axial axis. The rotational module 98*e* is comprised of a plurality of arcuate slots 101*e* formed in the slider 99*e*' and a plurality of slot screws 104*e* which are inserted through compliant washer 102*e* and slot bushing 103*e* and threaded into housing 38*e* through arcuate slots 101*e*. Complaint washers 102*e* are manufactured from natural rubber, natural rubber and synthetic rubber blends, nitrile, silicone or the like and provide a damped feel to the rotational adjustment. Rotational detent 69*e*' is provided by locators 71*e*' and grooves 72*e*' and provide rotational adjustment in increments. The amount of rotational adjustment is defined by the arc length of the arcuate slots 101*e*. The rotational adjustment in this embodiment is not lockable. Slot bushing 103*e* is properly sized to give the appropriate compression to compliant washer 102*e***.

Figure 6A:
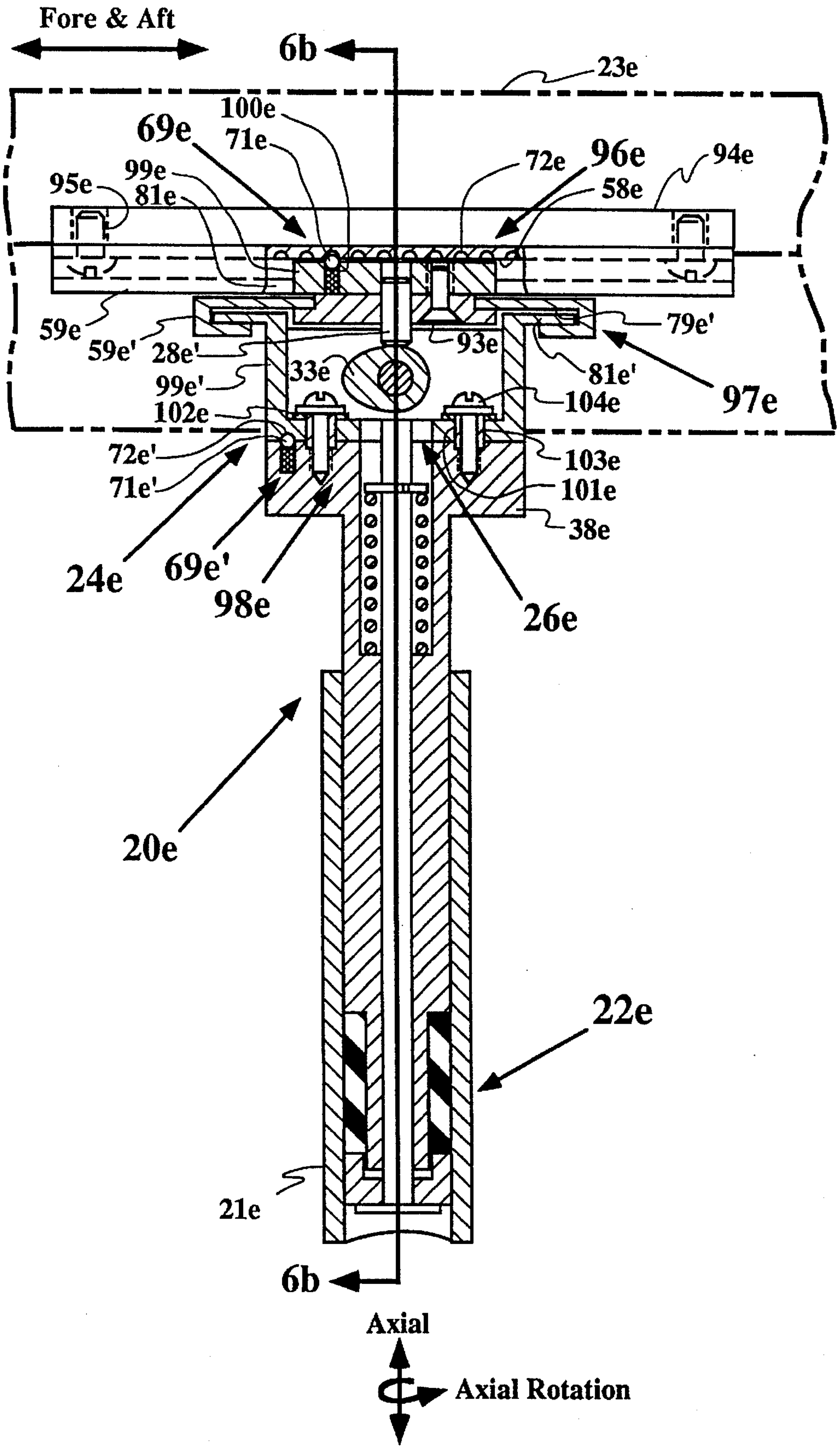
FIG. 6*a* is a partially sectioned side view of the another embodiment of the locking and positioning device capable of locking axial, lateral, and fore and aft movements which includes modular construction and illustrates another embodiment of detent mechanism.
Figure 6B:
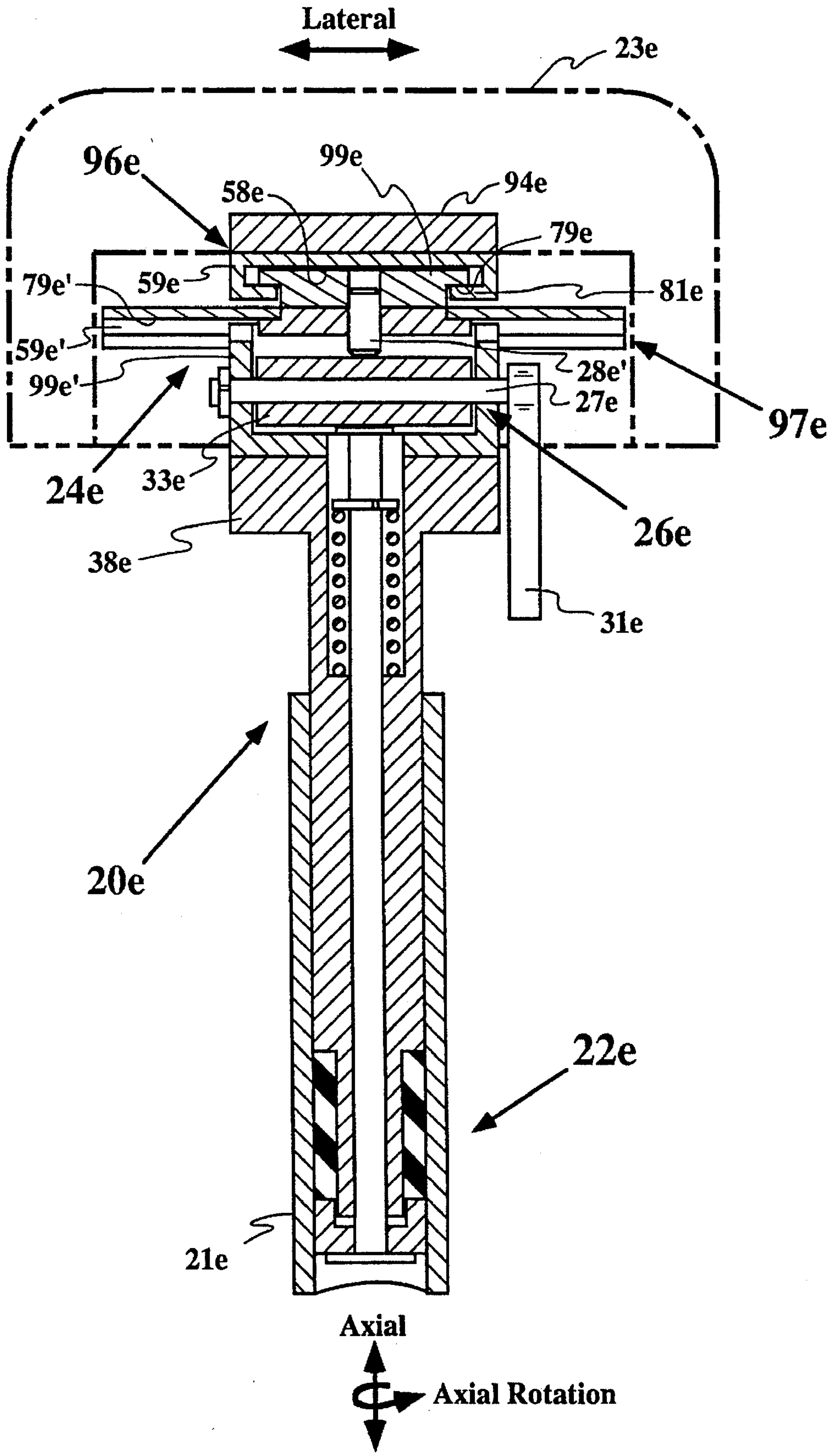
FIG. 6*b* is a partially sectioned front view of the FIG. 6*a* embodiment.

FIG. **6*b* illustrates another view of the locking and positioning device 20*e* shown in FIG. 6*a*. This view illustrates the elongated geometry of the cam 33*e*, similar to the FIG. 2*d* embodiment. The frame 59*e*' for the lateral module 97*e* is free floating in that it is connected to the fore and aft module 96*e* by way of the slider 99*e* and to the slider 99*e*' only by friction created between the channel slots 79*e*' and the channels 81*e*' (FIG. 6*a*). Since the frame 59*e*' is free floating, it is important that the pocket in the second member 23*e* be sized to limit the frame's (59*e*') lateral play. The actuation device 26*e* is shown in the position where the first locking mechanism 22*e* is locked and the second locking mechanism 24*e*** is unlocked.

In operation, when the actuation rod **28*e*' is axially translated to contact the surface 58*e*, this causes a friction force to develop between the channels 81*e* of frame 59*e* and the channel slots 79*e*, locking fore and aft motion. Similarly, this same actuation causes a reaction force which causes friction between the channel slots 79*e*' and the channels 81*e*' (FIG. 6*a***), locking lateral motion.

Figure 6C:
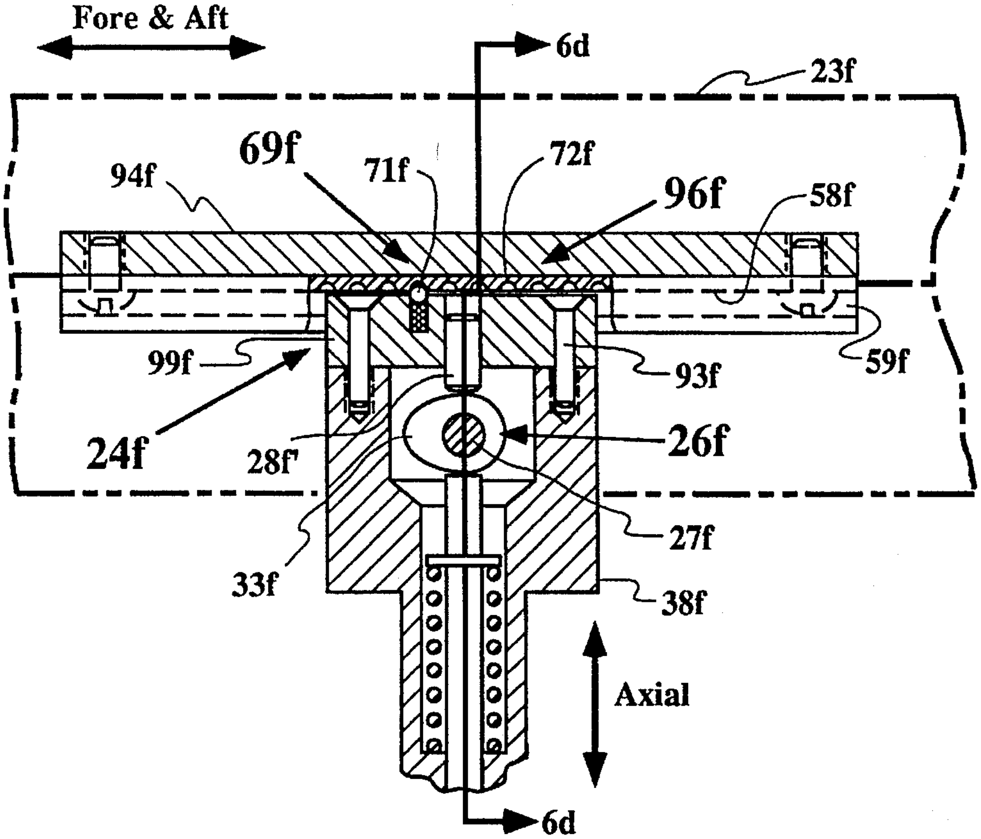
FIG. 6*c* is a partially sectioned side view of the second locking mechanism and actuation device illustrating an embodiment with a fore and aft module only.
Figure 6D:
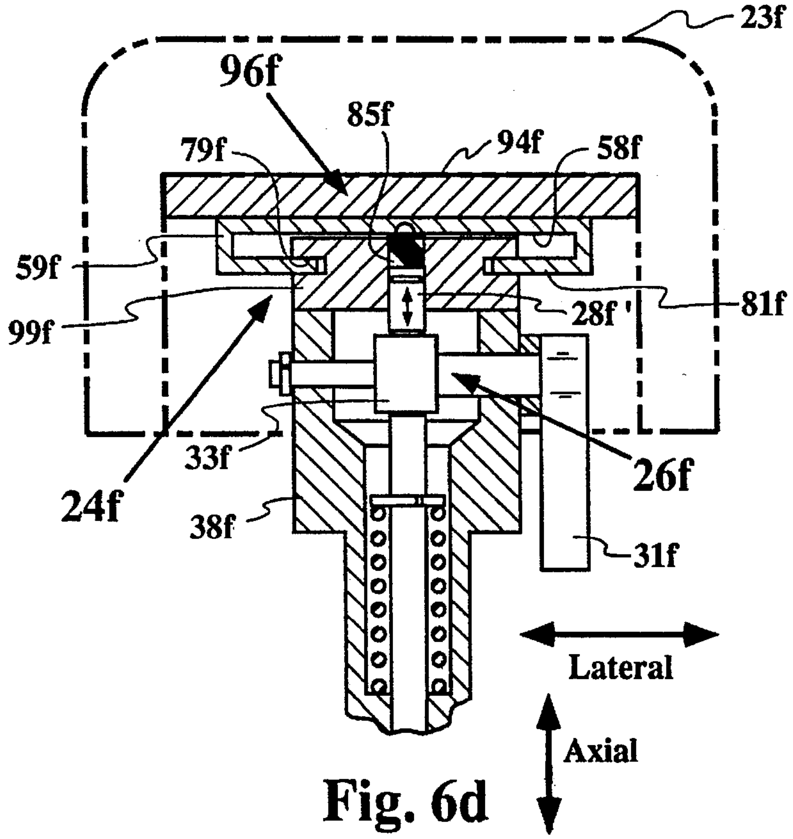
FIG. 6*d* is a cross-sectional end view of the embodiment of FIG. 6*c* as seen along line *6d—6d;*

FIG. **6*c* and 6*d* illustrate the fore and aft module alone as the second locking mechanism 24*f* in the environment of an adjustable chair armrest. The fore and aft module 96*f* is actuated by the actuation device 26*f* as is the first locking mechanism (only a portion of which is shown). The slider 99*f*, in this embodiment, attaches directly to the housing 38*f*. As described before, the fore and aft module 96*f* may include optional detent 69*f*. Locking occurs when cam 33*f* is rotated via lever 31*f* actuated by user. As shown in FIG. 6*c* the first locking mechanism (only a portion of which is shown) is locked and the second locking mechanism 24*f* is not locked. Locking of the second locking mechanism 24*f* is accomplished by forcing actuation rod 28*f* to contact surface 58*f* of frame 59*f* by rotating cam 33*f*. This causes channel slots 79*f* to frictionally engage with channels 81*f* and cause locking. A compliant puck 85*f* (shown as an option in FIG. 6*d*) may be used on the top side of the actuation rod 28*f* for a more progressive feel to the locking, similar to the pucks 85*c* of the FIG. 4*a* embodiment. Screws 93*f* are used to attach slider 99*f* to housing 38*f***.

Figure 6E:
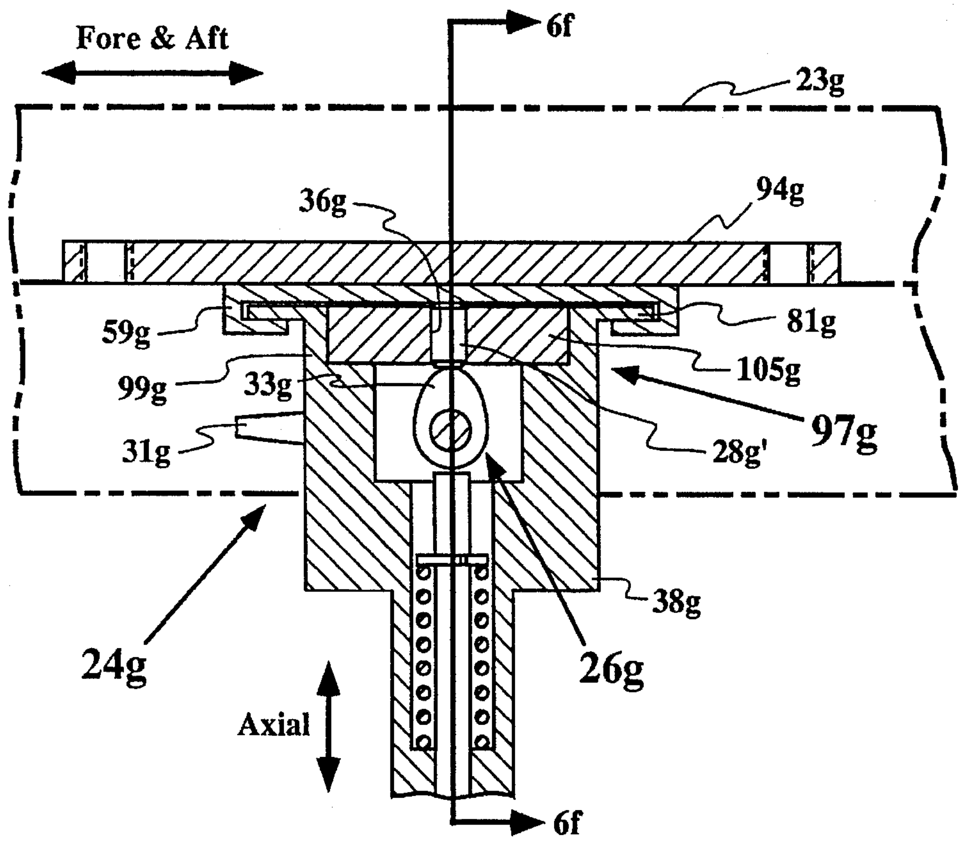
FIG. 6*e* is a partially sectioned side view of the second locking mechanism and actuation device illustrating an embodiment with a lateral module only.
Figure 6F:
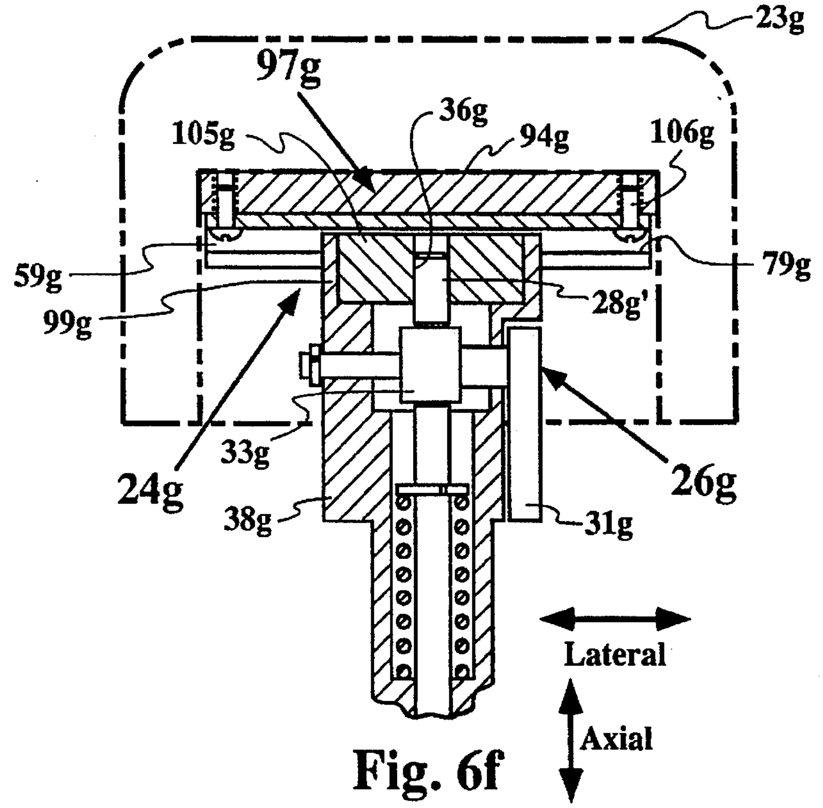
FIG. 6*f* is a partially sectioned end view of the embodiment of FIG. 6*e* as seen along line *6f—6f.*

FIG. **6*e* and 6*f* illustrate a lateral module 97*g* alone as the second locking mechanism 24*g*. In this embodiment, the slider 99*g* is part of the housing 38*g*. A plug 105*g* is used for forming the guide 36*g* for slidingly receiving the actuation rod 28*g*'. Plug 105*g* is preferably press fit into and is part of housing 38*g*. The lateral module 97*g* attaches to the bonding plate 94***g* by way of lateral fasteners 106*g*. Lateral adjustment is accomplished by channels 81*g* on slider 99*g* sliding along channel slots 79*g* formed on frame 59*g*. The actuation device 26*g*, including cam 33*g* and lever 31*g* in the FIG. 6*e* are shown actuated such that the first locking mechanism (only a portion shown) and the second locking mechanism 24*g* are locked. FIG. 6*f* illustrates the first locking mechanism (only a portion shown) locked and the second locking mechanism 24*g* unlocked.

In summary, the present invention is a locking and positioning device which allows the locking and adjustment of multiple degrees of freedom with the action of a singular actuation device. In particular the device is comprised of a first locking mechanism capable of locking at least one degree of freedom, and a second locking mechanism capable of locking at least one other degree of freedom, said second locking mechanism being separate, independent, and spaced apart from said first locking mechanism, and a singular actuation device for actuating both the first and second locking mechanisms, either simultaneously or independently.

While the preferred embodiment of the present invention has been described in detail, various modifications, alterations, changes and adaptations to the aforementioned may be made without departing from the spirit and scope of the present invention defined in the appended claims. It is intended that all such modifications, alterations and changes be considered part of the present invention.

What is claimed is:

1. A locking and positioning device, comprising:

a) a first locking mechanism having two positions a locked position and an unlocked position, for allowing adjustment and locking of a first member relative to a second member along a first axis;

b) a second locking mechanism having a locked and an unlocked position, said second locking mechanism being separate, independent, and spaced apart from said first locking mechanism for allowing adjustment and locking of said first member relative to said second member along a second axis which is substantially perpendicular to said first axis;

c) a singular actuation device operable by a user to selectively lock and unlock both said first locking mechanism and said second locking mechanism either simultaneously or independently by movement of said singular actuation device.

2. A locking and positioning device of claim 1 wherein said first and second locking mechanisms are both actuated by said singular actuation device which includes a cam which may be rotated to selected positions.

3. A locking and positioning device of claim 1 wherein said first and second locking mechanisms are actuated by said singular actuation device which includes a trigger-type lever rotatably hinged about a pin joint.

4. A locking and positioning device of claim 1 wherein said first and second locking mechanisms are actuated by said singular actuation device which includes a threaded member.

5. A locking and positioning device of claim 1 wherein at least one of said first and second locking mechanisms is held in the locked position by a biasing spring.

6. A locking and positioning device of claim 1 wherein said second locking mechanism further comprises:

a) a housing for attachment to said first member by way of said first locking mechanism;

b) a first clamping member having a first clamping surface adjacent said housing;

c) a second clamping member connected to an actuation rod, said second clamping member having a second clamping surface formed thereon;

d) a spring interactive with said second clamping member to provide a spring force causing said second clamping surface to forcibly compress said second member between said first clamping member and said second clamping member which resultantly locks said first member in a position relative to said second member; and e) an actuation device connected to said housing and interactive with said actuation rod to cause actuation of said second clamping member, said actuation of said actuation rod causing a relief of said compression and resultant unlocking to enable said first member to be adjusted and repositioned relative to said second member.

7. A locking and positioning device operable by a user for accomplishing positioning and locking of a first member relative to a second member, comprising:

a) a first locking mechanism having a locked and an unlocked position for allowing adjustment and locking of at least one of six degrees of freedom of said first member relative to said second member;

b) a second locking mechanism having a locked and an unlocked position said second locking mechanism being separate, independent and spaced apart from said first locking mechanism for allowing adjustment and locking of at least one other of said six degrees of freedom of said first member relative to said second member;

c) an actuation device able at the selection of said user to perform each of i) adjusting said first locking mechanism while leaving said second locking mechanism in said locked position, ii) adjusting said second locking mechanism while leaving said first locking mechanism in said locked position, and iii) adjusting both first and second locking mechanisms simultaneously.

8. A locking and positioning device of claim 7 whereto said first locking mechanism includes a compressing element which compresses a bulging member to cause said bulging member to expand and lockingly interact with a bore to cause locking between said first and said second member.

9. A locking and positioning device of claim 8 wherein said compressing element comprises an actuation rod which is biased toward a first position by a spring causing said bulging member to expand.

10. A locking and positioning device of claim 7 wherein said first locking mechanism allows adjustment and locking of said at least one of six degrees of freedom, said at least one of six degrees of freedom being along an axial axis.

11. A locking and positioning device of claim 10 wherein said first locking mechanism further allows adjustment of a second degree of freedom about said axial axis.

12. A locking and positioning device of claim 10 wherein said second locking mechanism allows locking and adjustment in said at least one other of said six degrees of freedom, said at least one other of said six degrees of freedom being along a lateral axis.

13. A locking and positioning device of claim 12 wherein said second locking mechanism further allows locking and adjustment in a second degree of freedom, said second degree of freedom being along a fore and aft axis.

14. A locking and positioning device of claim 13 wherein said second locking mechanism allows locking and adjustment in a third degree of freedom, said third degree of freedom being about said lateral axis.

15. A locking and positioning device of claim 7 wherein said second locking mechanism allows locking and adjustment in said at least one other of said six degrees of freedom, said at least one other of said six degrees of freedom being pitch about a lateral axis.

16. A locking and positioning device of claim 7 wherein at least one of said first locking mechanism and said second locking mechanism includes a detent.

17. A locking and positioning device of claim 7 wherein said second locking mechanism includes modules allowing each degree of freedom, including fore and aft, lateral and rotational locking and adjustment to be individually attained by selecting the appropriate module.

18. A locking and positioning device of claim 7 wherein at least one of said first locking mechanism and said second locking mechanism includes limiting stops to restrain an amount of travel.

19. A locking and positioning device of claim 18 wherein at least one of said first and second locking mechanisms, is actuated by said singular actuation device which includes a radially expanding compliant bulging member.

* * * * *